May 4, 1965  D. R. PEARL  3,181,818
SHOCK WAVE POSITION CONTROLLER
Filed Dec. 19, 1962  6 Sheets-Sheet 4

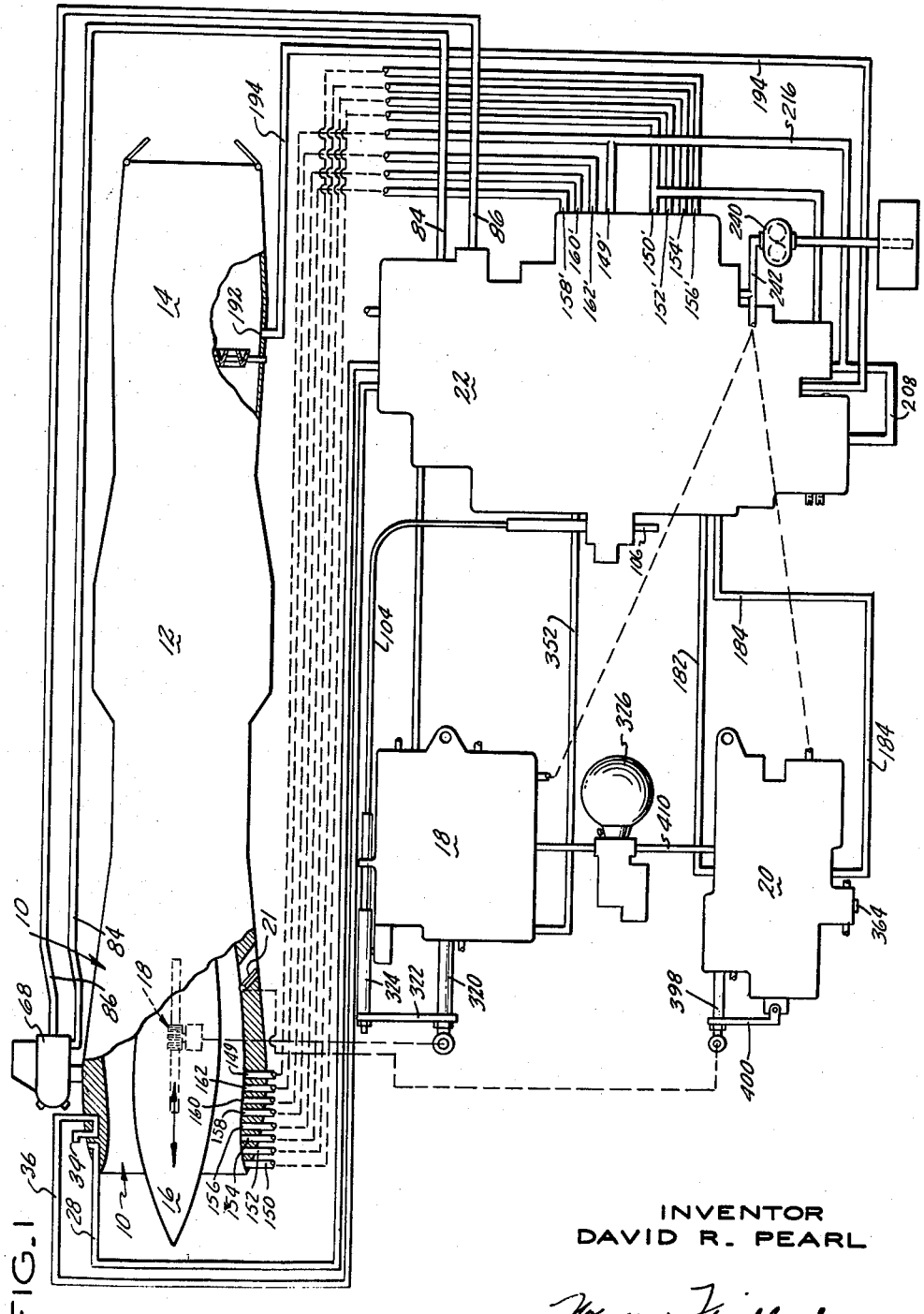

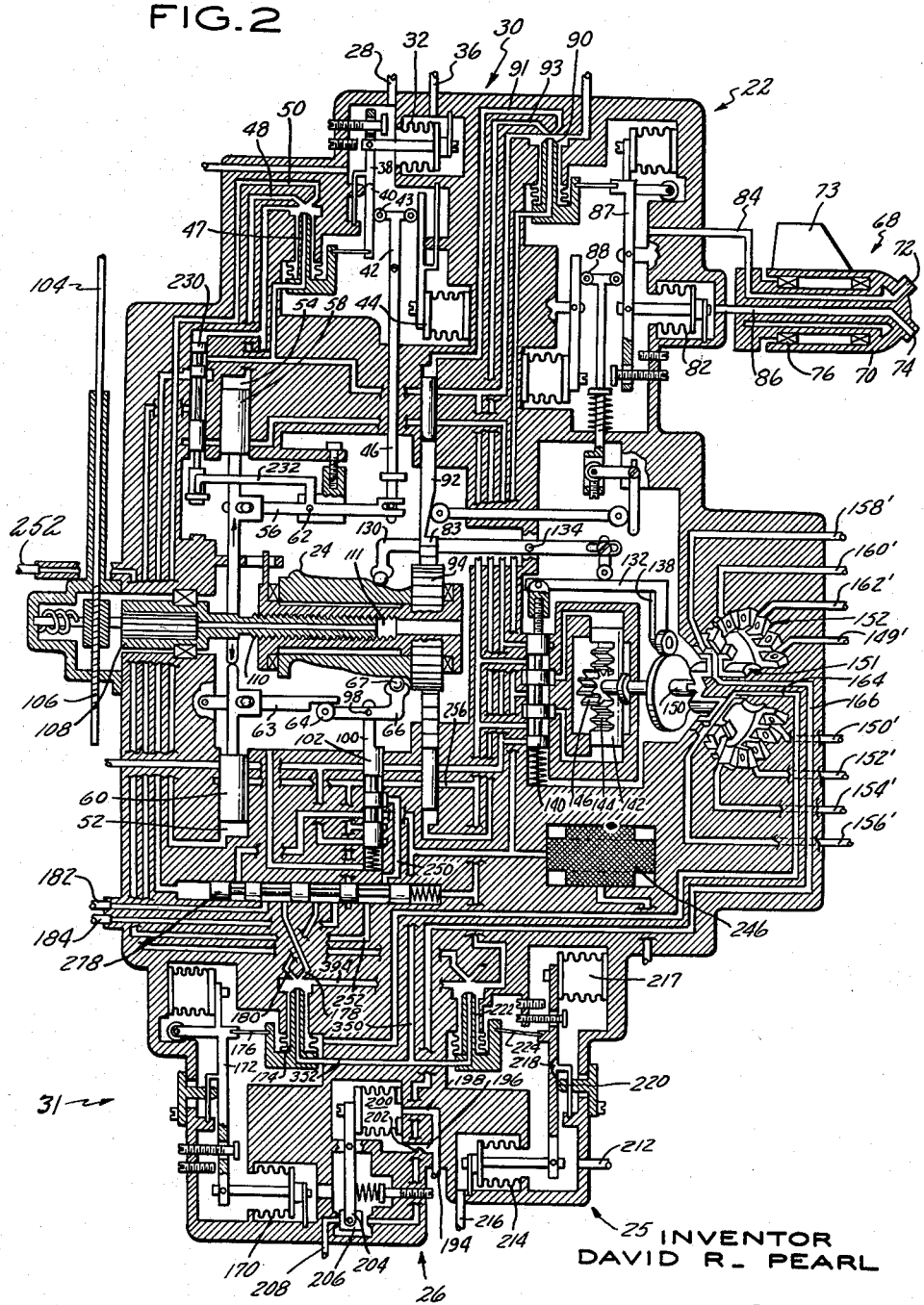

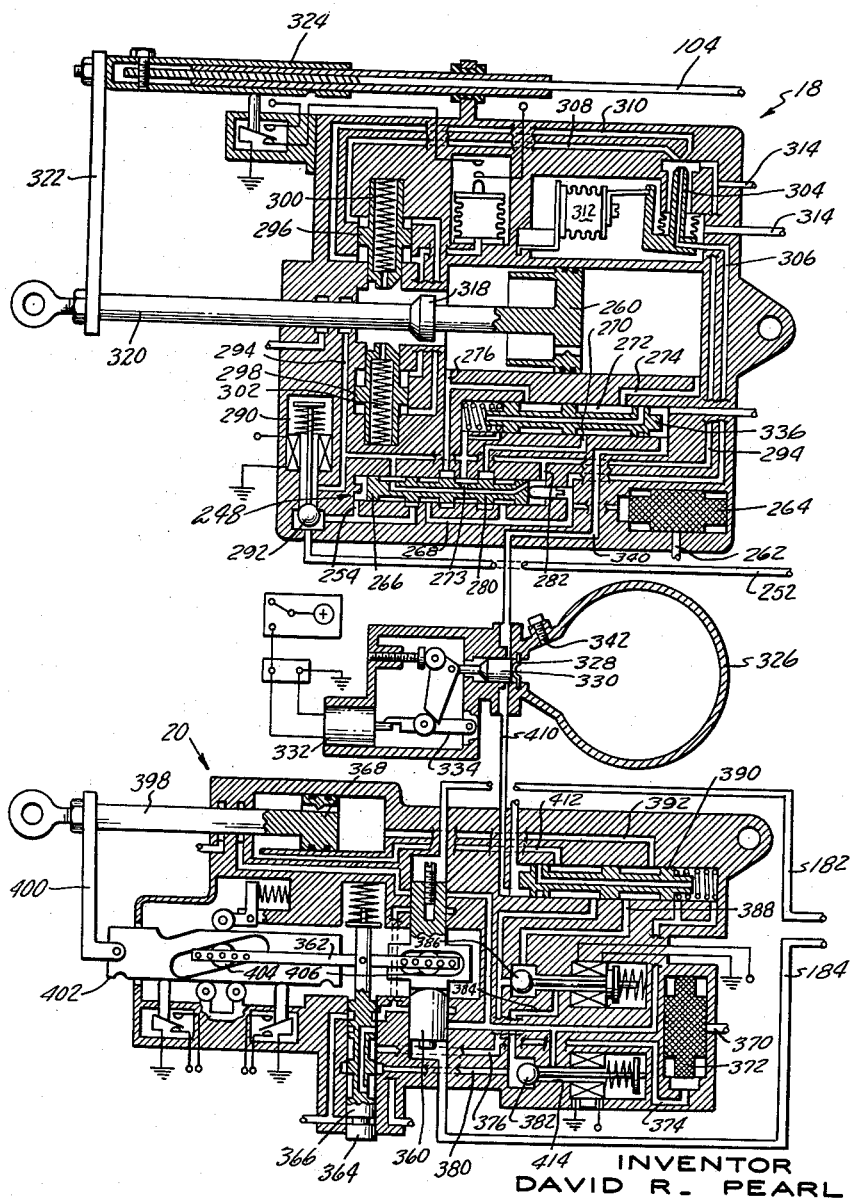

INVENTOR
DAVID R. PEARL
BY Norman Friedland
AGENT

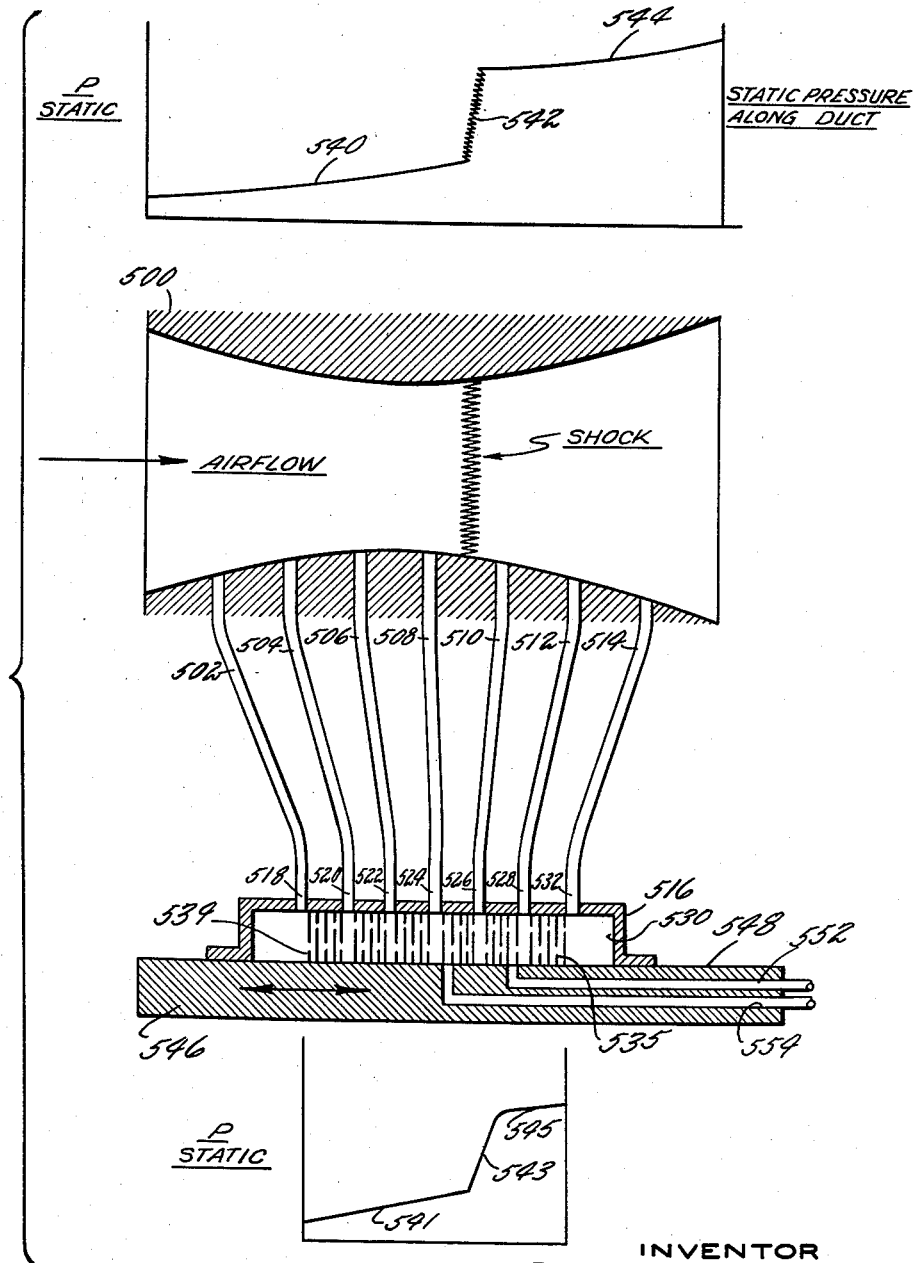

May 4, 1965 D. R. PEARL 3,181,818
SHOCK WAVE POSITION CONTROLLER
Filed Dec. 19, 1962 6 Sheets-Sheet 6
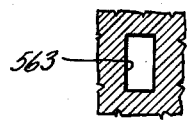
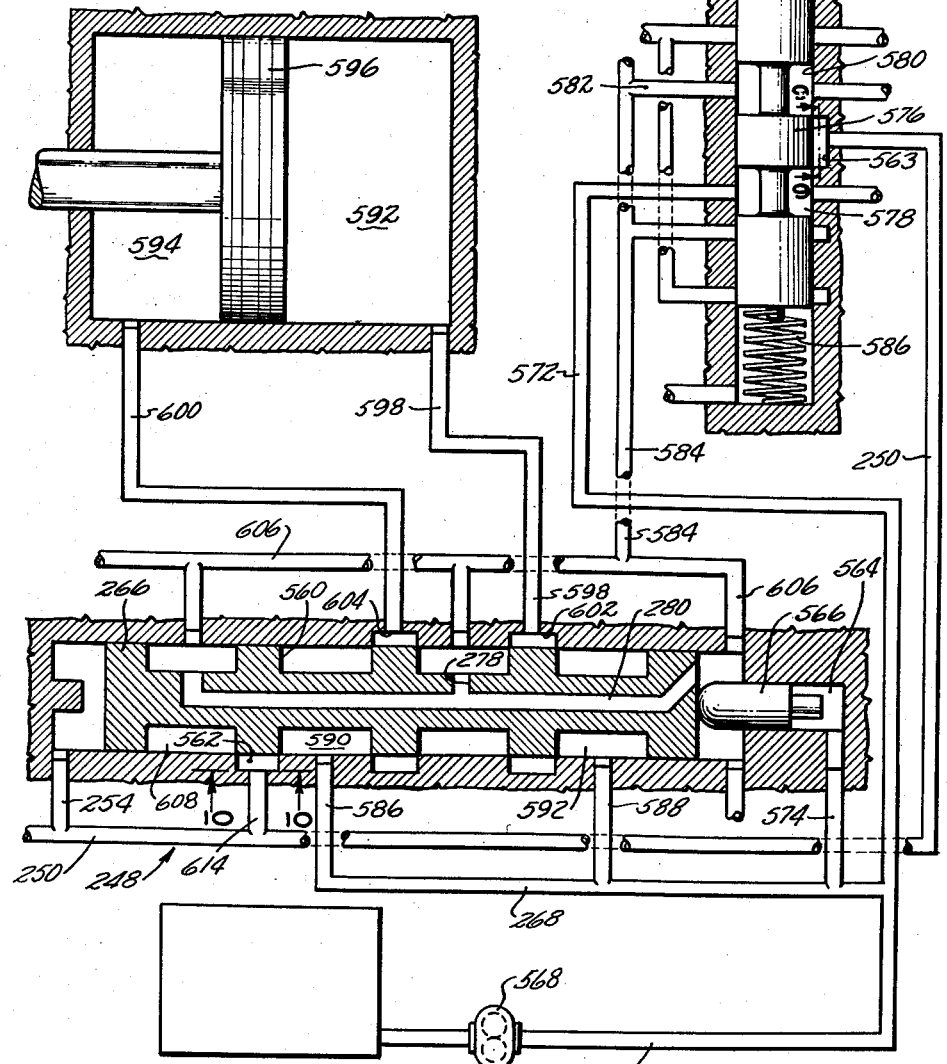
INVENTOR
DAVID R. PEARL
BY Norman Friedland
AGENT United States Patent Office 3,181,818
Patented May 4, 1965

3,181,818
SHOCK WAVE POSITION CONTROLLER
David R. Pearl, West Hartford, Conn., assignor to United Aircraft Corporation, East Hartford, Conn., a corporation of Delaware
Filed Dec. 19, 1962, Ser. No. 245,913
12 Claims. (Cl. 244—53)

This invention relates to air inlet controls for supersonic air vehicles and more particularly to means for simulating the pressure in the inlet duct in a remotely mounted device.

The purpose of a variable geometry air inlet for supersonic air vehicles is to efficiently decelerate the airflow to the engine and to provide optimum matching of inlet and engine airflow requirements. Airflow to existing airbreathing engines must be subsonic so that it is necessary to decelerate the air during supersonic flight. Deceleration from supersonic to subsonic velocity is accompanied by a shock which converts the kinetic energy of the incoming air to potential static pressure energy. This conversion is not 100% efficient so that there is also a total pressure loss across the shock. This loss is minimized when the velocity of the air entering the shock is as close to Mach 1.0 as possible. Thus, for high supersonic speeds an internal compression inlet is utilized, where the air is decelerated in a supersonic diffuser upstream of the throat of a converging-diverging inlet. A normal shock is then established at the throat and by varying the inlet geometry, the air velocity at the normal shock can be set close to Mach 1.0. Optimum inlet geometry varies as a function of flight conditions and is also different for take-off and subsonic flight. Thus, a control is required which senses these flight conditions and positions the variable inlet in an optimum fashion.

When the inlet is positioned for maximum pressure recovery (a measure of efficiency), an additional requirement is the need for matching engine airflow requirements with the actual inlet airflow. This is accomplished by allowing excess airflow in the inlet and by providing a bypass upstream of the engine face to bypass the proper amount of air. The control senses engine airflow needs and varies the bypass area to provide optimum airflow matching.

A started inlet is defined as one in which the normal shock is established at the throat. Under certain transient conditions, the variable geometry or the variable bypass area may be incorrectly set for the existing conditions in such a way as to cause an inlet unstart. In this condition the normal shock at the throat is expelled forward to the slip of the inlet. In this position the pressure recovery is drastically reduced and excess air is spilled outside of the inlet producing drag. The control senses an unstarted inlet and automatically restarts the inlet with the proper movement of the variable geometry and the bypass. It then re-establishes normal and efficient inlet operation.

The control serves to schedule the position of the normal shock waves by measuring the static pressure of two adjacent stations along the longitudinal axes of the inlet duct, convert these pressures into a value of the ratio of the two pressures, and compare it to a fixed ratio value which is indicative of the ratio when the shock is between the two stations. Corrective action, by opening or closing the bypass, will cause the shock wave to move therebetween.

I have found that a device remotely mounted from the duct, which has a series of chambers communicating with a series of taps along the axes of the duct can accurately reproduce the static pressure in the duct to any desired distance scale. The chambers are formed adjacent to each other and provide means for conducting flow through each while controlling the pressure drop from chamber to chamber.

The device, in essence, samples the average static pressure at each of several stations along a large air duct, brings these pressures to a small remotely mounted instrument in which the pressure variations along the main duct are accurately reproduced on a smaller scale. The instrument contains a plurality of chambers, and flow from these stations is conducted through these chambers in such a manner that the pressure drop between adjacent chambers produces the actual or desired replica pressure profile of the duct. A cooperating member moves with respect to these chambers for selectively picking up the pressures corresponding to the desired stations in the duct and transmitting these pressures as a signal to be utilized to control a bypass.

It is therefore an object of this invention to provide a control for scheduling the shock wave in a duct by simulating or duplicating the pressures in the duct in a remotely mounted instrument.

It still is a further object to provide in a control as described mechanism cooperating with said instrument to selectively pick up the pressures in the instrument which exactly correspond to particular stations in the duct.

It still is another object of this invention to provide means for duplicating on a smaller distance scale in a remotely mounted device, the static pressure of fluid passing through a fluid duct.

Other features and advantages will be apparent from the specification and claims and from the accompanying drawings which illustrate an embodiment of the invention.

FIG. 1 is a general schematic showing the air inlet control and the variable geometry and bypass actuators, and their relationship to the inlet duct and an airbreathing engine with afterburner.

FIG. 2 is a schematic illustration of the control shown in FIG. 1.

FIG. 3 is a schematic illustration of the actuators and emergency system shown in FIG. 1.

FIG. 6 is a schematic illustration of pressure duplicating valve connecting a duct together with a graphical illustration showing the pressure profile along the duct and pressure duplicating valve.

FIG. 8 is an exploded schematic showing of the first and second stage hydraulic amplification system with the hydraulic feedback.

FIG. 9 is a section taken along line 9—9 of FIG. 8.

FIG. 10 is a section taken along line 10—10 of FIG. 8.

Figure 5:
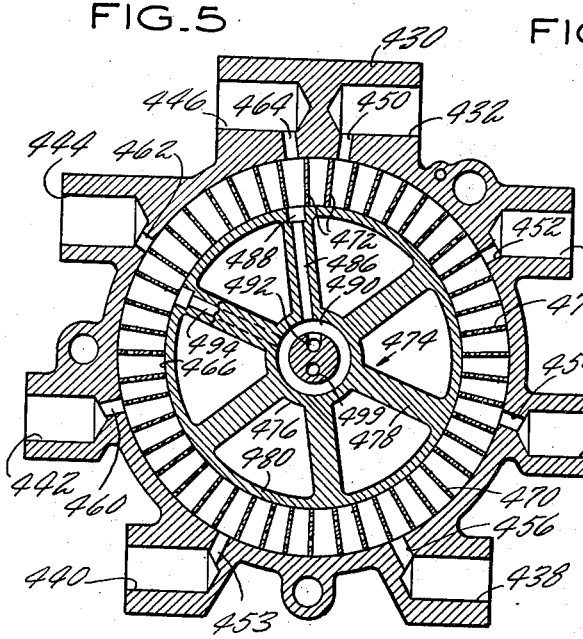
FIG. 5 is a section taken along lines 5—5 of FIG. 4.
Figure 4:
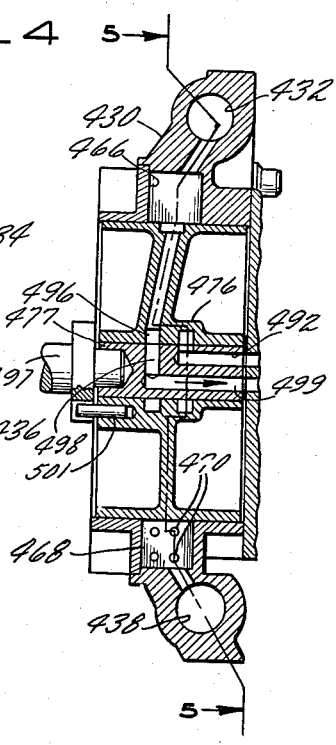
FIG. 4 is a sectional view showing the construction of the traversing pressure probe.

Referring particularly to FIGS. 1–4 which show an inlet duct generally indicated by numeral 10 connected to an air-breathing powerplant generally indicated by numeral 12 and an afterburner generally indicated by numeral 14. The inlet geometry is varied by means of an axisymmetrical spike 16 which is moved in and out of the inlet in a fore and aft direction by a spike actuator generally indicated by numeral 18. The inlet bypass 21 is positioned by a bypass actuator generally indicated by numeral 20 for varying the bypass area in order to bleed a portion of ram air for positioning the normal shock wave. The control generally indicated by numeral 22 serves to sense a plurality of parameters for controlling both of the actuators so as to provide optimum operation for all conditions of the flight of the airplane. Thus, in order to control the position of the normal and oblique shocks and obtain maximum efficiency from the air inlet, control means are provided for sensing these parameters and in accordance with these parameters vary the spike position and open and close the bypass.

As will be explained in more detail hereinbelow, the control 22 schedules the position of the spike and the bypass by moving three-dimensional cam 24, which is simultaneously movable axially and rotatably in response to the actual position of the spike and the attitude of the inlet respectively. The control also senses the local Mach number, compares actual local Mach number with the three-dimensional cam output, and positions the spike as a function thereof. Also, another output of the three-dimensional cam positions the normal shock in its optimum position, and the control utilizes this shock position signal to position the bypass. Therefore, it can be seen that the position of the bypass and spike, which are scheduled by the cam, are scheduled as a function of local Mach number, actual spike position and attitude. The control can then be viewed as a device which senses a plurality of inlet conditions or variables, computes these variables for generating signals in order to schedule the position of the bypass and spike.

In addition, the control serves to assure that the shock is not disgorged, or if disgorged, is reswallowed during certain flight regimes. To this end the control contains a shock expulsion sensor generally indicated by numeral 25 and an afterburner anticipator generally indicated by numeral 26.

As noted in the drawings, the local Mach number is sensed by directing static pressure sensed near the cowl lip through line 28 to local Mach number sensor generally indicated by numeral 30. This pressure is admitted internally to the sensor case and to bellows 32 which are externally subjected to local Mach number pitot pressure sensed by pressure pickup 34 and conducted through line 36. The local Mach sensor measures the ratio of these two signals by applying the differential pressure between the local Mach static pressure and the local Mach Pitot pressure to one end of the fulcrum lever 38. The relative position of lever 38 which rotates about pivot 40 governs the position of the roller containing member 42. Member 42 has one end subjected to a force created by an evacuated bellows 44 which serves to reference the pressure signal to an absolute value. The longitudinal position of rollers 42 and hence its connecting rod 46 is proportional to the ratio of the two pressures. This linkage is specifically designed so that when the servo system controlled by this linkage is balanced or nulled, the ultimate position of the servo is a function of the ratio of the two pressure signals mentioned above. This is effected by attaching to one end of fulcrum lever 38, hydraulic jet nozzle 47. The jet nozzle pivots with respect to the fluid receiving passages 48 and 50 for controlling the hydraulic pressure in and flow to chambers 52 and 54 respectively. Lever 56 is connected to the pistons 58 and 60 and pivots about fulcrum 62 for adjusting the position of lever 46.

From the foregoing it is apparent that as the pressure differential across bellows 32 changes, fulcrum lever 38 pivots about pivot point 40. This in turn adjusts the position of jet nozzle 47 for directing high pressure fluid to either of the pressure receiving passages 48 or 50, depending on whether it was a clockwise or counterclockwise movement. Whichever passage receives the high pressure fluid will conduct this flow to either chamber 52 or 54 for altering the position of pistons 58 and 60. This new position in turn is fed back through lever 46 by virtue of bar 56 for repositioning roller members 42. When the system has reached its equilibrium point, the pistons 58 and 60 will reach the position proportional to the ratio of the two pressures and the jet nozzle will be returned to its original position or the point of equilibrium.

As will be appreciated from the foregoing, the pistons 58 and 60 move to a position which is indicative of the pressure ratio of the local Mach number produced by the local Mach sensor. This position is then transmitted to a linkage system comprising a first lever member 63 which has one of its ends pressing against the rollers 64. This roller is supported by a follower lever 66, which has an opposite end attached to roller 67 which bears against the three-dimensional cam 24. A predetermined schedule is imposed on the surface of three-dimensional cam 24 for scheduling the position of the spike. The schedule, as will be further explained, is also responsive to the attitude of the inlet with pressure to the airstream.

Pressures indicative of attitude are sensed by the attitude Pitot probe 68, which comprises an outer housing 70 having an opening 72 and an opening 74. Each of the openings sense pressures at the inlet. The outer housing carries a fin 73 which rotates in response to the movement of the inlet. The outer housing is supported by bearings 76. In the event that the position of the inlet varies with respect to the direction of the airstream, the fin rotates about the longitudinal axis and each of the openings will sense a new pressure and transmit those pressure signals to attitude sensor generally indicated by the numeral 22.

The pressure picked up by the opening 72 is admitted internally to the sensor case and to bellows 82 via line 84 and the pressure admitted in the opening 74 is directed through line 86 to act on the external portion of bellows 82. In this manner, the bellows serve to measure the differential pressure between the two signals. This, in essence, provides an attitude signal which responds to both the angle of attack and yaw, or the deviation of the inlet about the vertical and horizontal axes of the inlet. The signal sensed by bellows 82 is transmitted to lever 87 for positioning rollers 88 in a manner similar to what was described in connection with the local Mach sensor 30. The force sensed by rollers 88, in turn, is transmitted to the jet nozzle 90 which serves to control the attitude servo piston 92 by directing fluid through passages 91 and 93 to either end of the piston for translating said piston. The piston carries rack gear 83 which translates with the piston and mates with pinion gear 94 attached to three-dimensional cam 24. Upon translation of the rack gear, the pinion gear rotates, hence causing rotational movement of cam 24. It is seen therefore that the rotational movement of cam 24 is a function of the attitude of the inlet with respect to the moving airstream.

Thus, from the foregoing it is apparent that the three-dimensional cam schedules a spike position as a function of the local Mach number and the attitude. This can be further evidenced by the description to follow. As for example, when the attitude transmits a signal to the three-dimensional cam, it will rotate to position the follower 67 to correspond to the change in the attitude. When this occurs, the lever 66 pivoting about roller 64 causes the point 98 to translate. As was described above, the position of lever 62 and roller 64 is a function of the actual local Mach number which was sensed by the local Mach sensor, and is an indication of the scheduled spike position for the particular flight condition. Thus, if there is a disturbance in the balance of these linkages, a motion proportional to the spike position "error" will be imposed on the pilot lever 100 of pilot valve 102 and as will be described hereinbelow, this pilot valve conducts servo fluid to the spike actuator for positioning the spike to its desired position. As the spike translates, spike position feedback cable 104, which follows the position of the spike, carries therein a spline arrangement generally indicated by numeral 106 for rotating member 108 until the desired position is reached. Member 108 carries screw thread 110 which mates with internal thread 111 of three-dimensional cam 24. Rotation of member 108 causes translation of cam 24. As cam 24 is translated, it reschedules the follower lever 66 to return to its original position. When follower lever 66 has achieved its original position, the pilot valve 102 will return to its line-on-line position to close off the flow of servo fluid to the spike actuator and hence reach its steady state condition. When this occurs, the spike is at its new position corresponding to the local Mach number and attitude as scheduled by the three-dimensional cam. Any variation of the local Mach number will always cause an unbalance in the system and a similar occurrence of events will take place.

From the foregoing, it therefore becomes apparent that the spike is scheduled as a function of the local Mach number and the attitude as described above. It will also be understood that the axial position of cam 24 is indicative of the axial position of the spike as a result of the feedback mechanism just described. Since the geometry of the inlet is determined by the relative position of the spike with respect to the inlet, it can be said that the axial position of cam 24 is indicative of the geometry of the inlet. Hence it can be said and for purposes of this description it will be understood, the geometry can be defined as the area of the inlet as defined by the spike position, and that position of cam 24 responds to the geometry of the inlet. Of course, other means of varying the geometry is contemplated within the scope of this invention.

In connection with the description of the attitude sensor, it should be pointed out that the attitude sensor contains a pair of evacuated bellows which serve to reference the attitude signal to a zero reference pressure signal. The details of the description of this device are omitted for the sake of convenience, but a more complete description may be had by referring to Patent #3,045,500, granted to E. R. Bruun on July 24, 1962.

As was indicated above, it is a purpose of control 22 to schedule the normal shock so that it will be located just downstream of the throat of the diffuser. This is accomplished by imposing a predetermined schedule on cam 24, which schedule is made a function of attitude and actual spike position, as was described above. A position selected by the actual spike position and the attitude sensor is picked up by follower 130 and transmitted to the pilot valve lever 132. By rotating follower 130 about pivot 134, it bears against member 132. One end of lever 132 carries the feedback arm 138, while the other end is connected to the pilot valve 140. Input from three-dimensional cam 24 through lever 130 to lever 132 moves pilot valve 140, producing hydraulic flow to traversing probe servo 142. This flow repositions the traversing probe servo 142 which carries rack gear 144 engaging the pinion gear 146. Translation of the traversing probe servo 142 will cause rotation of the pinion gear and the attaching shaft 150. The shaft 150 carries a feedback cam which renulls pilot valve 140 thru lever 132. Thus, servo position is a function of three-dimensional cam output. The shaft 150, also carries a traversing probe valve 152 which serves to select points in the inlet where the normal shock is desired. The actual details of the traversing probe valve will be described in connection with FIGS. 5 and 6 hereinbelow, but for an understanding of the operation of control 22, it is only necessary to understand that the traversing probe valve selects two adjacent pressures located in the inlet. This is accomplished by sensing a series of static pressures labeled as taps 150, 152, 154, 156, 158, 160 and 162 and conducting the pressures to the traversing probe valve thru the connecting lines 149', 150', 152', 154', 156', 158', 160' and 162'. The pressures are admitted at various intervals into a toroidal shaped chamber which contains a series of plates, each having several orifices. The chamber thus simulates a pressure profile that resembles the actual pressure profile in the inlet. A cooperating circular rotor 151, having a pair of passages 164 and 166, spaced apart, terminating adjacent to the pressure plates is attached to shaft 150 and rotates therewith to select two points along the inner circumference of the disk, which represents the points in the inlet where it is desired to hold the normal shock. The pressures picked up in passages 164 and 166 are directed to the shock position sensor generally indicated by numeral 31.

The shock position sensor contains linkage members cooperating with a bellows arrangement which will vary a jet nozzle whenever a preselected ratio dictated by this arrangement is deviated from. To this end, the sensor case and bellows 170 are internally subjected to the pressure conducted through line 164 and is subjected externally to the pressure conducted through passage 166. Whenever the pressure differential acting across that bellows disturbs the ratio dictated by the lever 172, the jet nozzle 174, which is attached to lever 172 through arm 176, will deviate from its balanced condition. When this should occur, high pressure servo fluid will register with either receiving passage 178 or 180, depending on the position of the normal shock. This high pressure servo fluid is then metered to the bypass actuator 20 through lines 182 and 184 to reposition the bypass. The bypass is adjusted to either open for bleeding off air flow from the inlet or to close to reduce the bleeding off of air flow, either of which results in a change of the back pressure behind the normal shock. Any variation in this back pressure will cause the normal shock to shift. Obviously, the directional shift depends on the directional change of pressure. In this manner, the normal shock will be readjusted until it falls between the two points selected by traversing probe valve 152. When this occurs, the shock position sensor 168 will return to its original position to assume the steady state condition.

In order to prevent disgorging of the shock which may occur due to a sudden transient change in pressure in the inlet occasioned by an engine transient characterized by a sharp rise in engine turbine discharge pressure, the afterburner anticipator sensor 26 is included and serves to anticipate a sudden rise in downstream inlet pressure and overrides the normal shock position signal to move the bypass actuator. To accomplish this, pressure tap 192 is inserted downstream of the engine turbine, and transmits pressure signal through line 194 to the afterburner anticipator sensor 26. The afterburner anticipator sensor contains a pair of passages 196 and 198 which transmit pressure from line 194 internally and externally respectively of bellows 200. A restriction 202 is inserted in passage 196 just upstream of the bellows to reduce the rate of flow of air. Thus, upon actuation of the afterburner, a sudden rise in pressure in the afterburner will occur which will cause a change in flow in passages 196 and 198 and a pressure drop across restriction 202 will result so that the pressure externally of the bellows at that instance will be lower than the pressure internally of the bellows. This will cause the bellows to expand and rotate lever 204 which carries on its end a double flapper valve 206. The double flapper valve will shift to close the end of line 166 and open line 208 to the inlet static pressure sensed by tap 155. The pressure tap feeding line 208 is located downstream of the normal shock position taps so that this pressure will always be higher than the pressure normally admitted internally of bellows 170. Thus, the bellows will contract, cause rotation of lever 172 and ultimate repositioning of jet nozzle 174. This will cause the bypass to open in anticipation of any disturbances in the inlet (due to ignition of the afterburner) and hence, anticipate the inlet pressure rise and react to prevent a shock expulsion.

A shock expulsion sensor 25 is provided to assure that the shock is reswallowed should it be disgorged for any reason. Disgorging of the shock may be the result of a violent disturbance in the engine or in the air profile entering the inlet. Disgorging of the shock is entirely undesirable since it may cause unstable flight operations or possible damage to the aircraft. Shock expulsion sensor 25 senses pressures fore and aft of the normal shock when it is in its correct position. The forward static pressure is conducted through line 212 to the sensor case and to the internal portion of bellows 214 and aft static pressure is admitted to the external portion of the bellows by conducting the pressure picked up in line 162 through line 216. The pressure transmitted thru line 212 also acts on evacuated bellows 217 to reference the pressure signal to an absolute value. The pressure differential sensed by bellows 214 is transmitted to fulcrum lever 218 which pivots about point 220. This lever is connected to jet nozzle 222 by link 224. When the shock is swallowed in the inlet, jet nozzle 222 continuously meters the servo fluid pressure to the left end of spool valve 228, overcoming the force of a spring acting on the right end of valve 228. Thus, the servo pressure, when acting over the left end of the spool, holds the spool in its most rightward or nonoperative position. When the shock is expelled, the pressure in line 212 will increase causing bellows 214 to expand, which, in turn, rotates the fulcrum lever 218 to reposition jet nozzle 222. This repositioning of the jet nozzle causes the servo pressure acting behind spool 228 to drain which, in turn, due to the action of the spring, shifts the spool 228 to the left. When this occurs, the lands on spool 228 will be repositioned, as will be described hereinbelow, to cause the spike to move toward its fully extended position, as well as causing bypass to move toward its full open position. The new position of the spike and the bypass serves to create the proper condition in the inlet for restarting the inlet.

It is apparent from the foregoing that the shock expulsion sensor and its attendant mechanism will override the effect of the three-dimensional cam.

In order to avoid opening of the bypass at low Mach number when the internal normal shock has not been established, a shock expulsion arming valve 230 is provided. This valve is actuated by the local Mach sensor by virtue of having a connecting lever 232 attached to feedback lever 56, which bears against the arming valve. As was explained above, the position of the feedback lever is a function of the local Mach number. Until the local Mach number has reached a predetermined value, valve 230 will be positioned to block off the signal from the shock expulsion sensor and continuously meter high pressure behind spool 228.

What has been described above is a control which basically serves to sense and compute the various parameters of the inlet for positioning the spike and the bypass actuators. The next portion of the description will be devoted to actuators 18 and 20 which are controlled in accordance with the signals generated by control 22 for positioning the spike and bypass respectively.

Still referring to FIGS. 1–4 and as was mentioned above, three-dimensional cam 24 schedules the spike by positioning follower 26 which in turn positions first stage valve 102. The position of first stage valve 102 is therefore proportional to the error received by the follower 26. In accordance with this error, the valve is translated to either direct high pressure fluid issuing from pump 240 and delivered through line 242 and filter 246 to the left end of second stage valve 248 by way of line 250, valve 228, line 252 and branch line 254 or connecting this end of valve 248 with drain by directing fluid back through line 254, line 252, valve 228, line 250 and the drain line 256. The second stage valve 248 serves to amplify the error signal generated by first stage valve 102 for positioning spike actuator piston 260. This is accomplished by directing high pressure fluid from line 262 which is directed through filter 264 to either chamber formed on either end of piston 260. Thus, to position the spike in an extended position, spool 266 of second stage valve 248 is urged to move to the left by draining the fluid acting on the left end of the valve, and by having the extreme right end of the valve subjected to high pressure fluid. This causes the lands of spool 266 to uncover the proper port for metering high pressure fluid issuing from line 268 and 270 to be directed to the chamber formed on the right hand end of actuator piston 260 by way of line 270, valve 272 and line 274. Since piston 260 is of the substantially equal area type the unbalance force acting on the right hand end of this piston will cause the actuator to move to the left and hence moving the spike in the extended position. It will be appreciated that when spool 266 has moved to the left, a land thereon uncovers a port communicating with the chamber formed on the left hand side of piston 260 by way of line 276. This port in turn communicates to drain by way of the drill passage 273 formed in spool 266 by conducting fluid through the centrally drilled passage 280 to line 282 and in turn with drain line 294. Of course, to position the spike actuator in the opposite position, the spool 266 of second stage valve 248 will be moved in the opposite direction to reverse the flow connection. Hence, the left hand side of piston 260 will communicate with metered pressure while the chamber formed on the right hand side of piston 260 will communicate with drain pressure. Second stage valve 248 contains a hydraulic feedback system which assures that motion of the spool 266 accurately corresponds to the motion of first stage amplifier valve 102. For the sake of convenience and since this system will be further described in more detail in connection with FIGS. 8 to 10, for the moment it is only necessary to appreciate that the second stage valve 248 serves to position actuator 260.

As was mentioned earlier, it is desirable to extend the spike actuator and maintain it in this position during certain regimes of flight operation. It is assumed that during this regime the control 22 will position the valve and spike to the extended position. To assure that the spike is in the extended position at this or any other time, the operator of the aircraft may select to engage a solenoid valve indicated generally by numeral 290 to unseat ball valve 292. When this occurs, it will be appreciated that the chamber formed on the left-hand side of spool 266 will communicate to drain through line 294 via line 254 and valve 290. This has the effect of shifting spool 266 to the extreme left and hence conduct high pressure fluid to the right-hand side of piston 260. As was mentioned above, this serves to move the spike to the extended position.

In order to assure that the spike does not inadvertently become moved out of the most extended position, the spike locks, which are normally retracted, are urged into the locked position. The spike lock comprises a pair of pistons 296 and 298 which are urged in the extended or engaging position by springs 300 and 302. These pistons are normally held in the retracted position by conducting metered pressure on the underside of the respective pistons. The force of the pressure of fluid acting on the underside of these pistons is sufficient to overcome the force exerted by the respective springs. This metered pressure is controlled by jet nozzle 304. The nozzle conducts high pressure fluid issuing from line 306 to either of the receiving passages 308 or 310. When the jet nozzle is positioned to the right, the high pressure fluid will be delivered to passage 310 to act on the underside of pistons 296 and 298, while the topside of the piston will be subjected to drain pressure being conducted through receiving passage 308. The jet nozzle is controlled by evacuated bellows 312, which is subjected to static pressure sensed in the inlet by way of line 314. When the aircraft has reached a predetermined altitude, the pressure which is a function of this altitude will create a signal sensed by bellows 312 to position the jet nozzle to the position shown in the drawing. Hence, it is apparent from the foregoing that in this position the high pressure fluid being conducted on the underside of pistons 296 and 298 will urge these pistons to the retracted position. These pistons which normally engage a fixed stop 318, carried by stem 320 projecting from piston 260, permits free movement of this entire assembly. Thus, the control 22 can position the spike in order to obtain the proper scheduled position.

As was mentioned above, the spike is positioned by piston 260 and the attendant mechanism and which position serves to generate a signal to position the three-dimensional cam 24. This is accomplished by physically attaching to connecting rod 320 a link 322 which serves to feed back a signal to the cam 24 by the spline assembly 324. The spline assembly and associated cable merely convert the longitudinal movement into a rotary movement for positioning the three-dimensional cam as mentioned earlier.

It will be appreciated that it is of the utmost importance to keep the spike in the extended position during certain flight operating regimes. This particularly is important during subsonic flights, particularly take-off and landing. To assure that the spike is in the extended position in the event of a hydraulic failure, an emergency system is provided. This emergency system comprises container 326 which carries a fixed charge of a suitable gas. The container is sealed by a frangible diaphragm 328 which is held in position by piston 330. In the event of a hydraulic failure, the solenoid 332 is manually actuated, thus disengaging lever arm 334 which allows the piston to move in a retracted position. The pressure acting on the inside of the diaphragm will be sufficient to burst the diaphragm and to allow the fluid charge to egress.

This pressure charge is delivered to the right-hand end of spool 336 to move it to the left against the force exerted by the spring acting on the extreme left-hand end of this spool. This has the effect of uncovering a port at the end of line 274 to allow it to communicate with the fluid egressing from container 326 through line 340 to subject the right-hand end of piston 260 to the same pressure for urging the piston to the extreme left spike or extended position. Filling of the container 326 is done through fill passage 342.

Actuator 20 serves to actuate the bypass in the open and closed position in response to a signal generated by the control 22. As was mentioned above, traversing probe valve 152 is scheduled to pick up two static pressure signals at predetermined stations along the inlet duct. These two pressures are then relayed to the shock position sensor which ascertains the ratio of these two pressures. If this ratio is within the value set by the shock position sensor, no signal will be produced. Thus, the shock will be in the proper location within the duct. However, should the shock be displaced from the desired position, the shock position sensor will be disturbed since the ratio of the pressure is not equal to the ratio value set by the sensor. When this occurs, the jet nozzle 174 will be displaced from its normal position which direction of displacement depends on the directional error noted by the shock positioner. Jet nozzle 174 discharges high pressure fluid received from lines 350 and 352 into either of the receiving lines 178 and 180. For example, in order to open the bypass doors, shock position sensor 30 will cause the jet nozzle 174 to rotate clockwise which in turn increases the pressure in line 178. The fluid is then directed through valve 278 which is held in the nonoperative position and into line 182 from where it is directed to integrating servo 360. As is evident from the drawing, the pressure on the top part of integrating piston 360 will increase, hence causing the piston to move downwardly. The connecting rod 362 suitably interconnected to piston 360 and bypass control valve 364 serves to control the position of the spool 366 of the bypass valve. Spool 366, which is normally held in the line-on-line position with the various metering passages, will be caused to displace and since piston 360 moves downwardly, so will spool 366. Spool 366 serves to meter high pressure to bypass door actuator piston 368. This is accomplished by directing high pressure from the pump into the actuator through line 370, which passes through filter 372 and from there is directed to the spool 366 of bypass control valve 364 and through lines 374 and 376. Suitable lands formed on spool 366 will uncover ports registering therewith for directing flow to the multiple area actuator piston 368, so that when spool 366 was caused to move downwardly, line 380 will become uncovered and opened to high pressure fluid and direct the metered fluid to the piston 368 through valve 382, passage 384, valve 386, passage 388, valve 390 and passage 392.

It will be appreciated that when the chamber formed on the top of integrating piston 360 was receiving high pressure fluid, the chamber formed on the bottom of this piston will be discharging to drain through line 184 through valve 228 and through line 180 and eventually to drain line 394.

From the foregoing, it will be apparent that jet nozzle 174 responds to the error signal generated by shock position sensor 30. In other words, when the ratio across the two points selected by the traversing probe valve is not compatible with the preselected ratio dictated by the shock position sensor 30, jet nozzle 174 will be caused to rotate. This error can be looked at as being the difference between the desired position of the shock and the actual position of the shock since the ratio selected by the shock position sensor 30 represents the desired position that the shock must be at with respect to the point selected in the duct by the traversing probe valve 152 and the actual position of the shock will be ascertained by the pressure sensed by the shock position sensor. The integrating piston 360 serves to integrate the error signal with respect to time in such a manner as to displace the bypass actuator piston 368. The integration will continue as long as jet nozzle is issuing more high pressure fluid to one or the other receiving passages 178 or 180. When the bypass has been positioned to correct the position of the shock, the shock position sensor will return to its null position, thus returning jet nozzle 174 to its original position; namely, the position where it is issuing an identical amount of fluid to passages 178 and 180. The bypass will at this time be at a new position corresponding to new inlet conditions. In order to return the bypass control valve 364 to its null position, actuator 368 carries a feedback connected to the piston stem 398 which comprises feedback lever 400, which, in turn, is connected to the feedback cam 402. Feedback cam 402, as is noted from the drawing, is made to translate with the actuator piston rod 398. A roller inserted in an inclined slot formed in cam 402 is fixed to one end of lever arm 362. Hence, it is apparent that translation of the feedback cam will cause lever 362 to rotate about the roller 406 carried in the slot of piston 360 and pivotally secured to the other end of lever 362. This will cause the spool 366 of bypass control valve to reposition in a direction to return the spool to its original line-on-line position. Thus, movement of actuator piston 368 is proportional to motion of the integrating piston 360 and this system forms a proportional stage of motion and force amplification.

As mentioned above, the actuator contains safety mechanism to assure that the inlet is at a satisfactory condition in the event of landing and taking off, should there be a failure in the hydraulic system. The emergency shuttle valve 390, which is substantially identical to valve 336 in actuator 18 serves to conduct the high pressure charge from container 326 to the left-hand end of piston 368, which urges the piston to the right and causing the bypass to close. Hence, upon bursting of the diaphragm 328, the fluid charge escaping out of container 326 will be conducted through line 410 to act on the left-hand end of valve 390 to urge valve 390 rightwardly against the force created by the spring acting on the opposite end. A land formed on valve 390 is shifted to uncover line 412 which communicates with the left-hand chamber formed adjacent to the piston 368 and conducts the high pressure charge through line 410 thereto.

The manual override solenoid valve 382 and 386 are provided on the bypass control 20 to allow the pilot to override the automatic system and position the bypass to either the open or closed position. As noted from FIG. 3, the valves 382 and 386 are connected in series with each other and in series with the bypass actuator piston 368. Valve 382 is normally held in position whereby metered pressure is uninterrupted and it seats against a passage communicating with drain pressure. Hence, upon actuation, valve 382 will unseat allowing the metered pressure to communicate with drain. The fluid in the chamber formed on the right-hand side of piston 368 will be directed through lines 392, valve 390, line 388, valve 386, line 384 through valve 382 and then out to drain through passage 414. Since the pressure behind the piston 368 has now been reduced and the high pressure fluid acting on the other side of piston 368 creates a force greater than on the opposite end, the piston will be moved rightwardly in a bypass closed position.

The actuation of valve 386 by the pilot will cause the valve to unseat, thus disconnecting line 384 from the chamber formed on the right-hand side of piston 368 and opening the chamber to high pressure fluid evidenced in line 376. When actuation occurs, high pressure fluid sensed in line 376 will be conducted through valve 386 to line 388 through valve 390 and into line 382 and eventually into the chamber formed on the right-hand side of piston 368. Since the valve is a half area piston, meaning that the area on the left-hand side is equal to one half the area on the right-hand side and since the pressures on both chambers are equal, the force acting over the larger area will cause the valve to move leftwardly to urge the bypass to move in the open position.

Reference is now made to FIGS. 4 to 7 which show the operation of traversing probe valve 152. As noted from FIGS. 4 and 5, the traversing probe valve comprises a housing 430, which contains a plurality of drill passages 432, 434, 436, 438, 440, 442, 444, and 446. These drill passages are suitably connected with lines 149', 150', 152', 154', 156', 158, 160' and 162', respectively, in the control 22. In this manner, as is apparent from the foregoing, the most forward station in the inlet registers with drill passage 432 and the most rearward station in the inlet registers with drill passage 446, and successive stations therebetween register with successive drill passages around the circumference of the housing 430. The flow from the first station then will be directed inwardly into a toroidal chamber formed in housing 430 to flow from the drill passage 432 to the drill passage 446. This is accomplished by providing drill passages 450, 452, 454, 456, 458, 460, 462 and 464 between the chamber and the corresponding drilled passages as shown in the drawing. Disposed in chamber 466 are a plurality of plates which extend transversely across the chamber to form a plurality of closed pockets. All of plates 468 contain a plurality of drill holes or orifices 470, except the two plates 472 disposed between drill passages 432 and 446. Plates 472 serve to prevent the fluid in the chamber from flowing counterclockwise instead of clockwise. Wheel or rotor 474 comprises hub 476 and a plurality of spokes 478 for supporting rim 480. The outer periphery of the rim lies adjacent to the inner edges of plates 468 and plates 472. It will be appreciated that the peripheral edge of rim 480 is closely fitted to the edges of these plates, without interfering with the free rotational movement of the wheel. Hub 476 may be rotatably supported within housing 430 by a suitable pintle 477. Drill passages 486 are formed in one of the spokes and communicate with port 488 placed adjacent to the outer peripheral edge of rim 480. The drill passage is connected to an annulus 490, which annulus, in turn, communicates with passage 492, which, in turn, is connected to line 164 (see FIG. 2). A similar drill passage 494 is formed in an adjacent spoke and communicates with line 166 (see FIG. 2) through drilled passages 498 and 499. Hence, it is apparent from the foregoing that the two spaced passages may be placed or positioned along any of the respective points within the chamber 466. The pressure sensed by these drill passages is then directed to the shock position senor 30 for performing the function as was noted above. Rotary movement may be imparted to wheel 474 by suitably attaching connecting shaft 497 to hub 476 by key 501.

As was described in connection with control 22, the traversing probe valve labeled 152, which was just described, serves to form a profile which is the duplicate of the pressure profile evidenced in the inlet duct. As is apparent from the above description, the traversing probe valve serves to sense a series of pressures extending along the side wall of the duct and relays a selected pair of pressures to the shock position sensor. The orifices formed in the plates serve to produce the pressure gradient which is the replica of the pressure gradient evidenced along the wall of the inlet duct. Thus, it can be seen that the traversing probe valve 152 samples the average static pressures of each of several stations along the large air inlet duct and then brings these pressures to a small remotely mounted instrument in which the pressure variant along the main duct is accurately reproduced to any desired distance scale so that measuring pressure ratio between two selected points on the shock position sensor will indicate pressure ratio between corresponding points in the inlet duct. This enables the controller 22 to sense the position of the shock wave in the main duct and by virtue of this sensing and the ability to move the traversing probe along any two stations enables the controller and actuator to position the shock in any desired position. As was noted above, this position is a function of the attitude of the inlet with respect to the air stream and the actual spike position.

Figure 7:
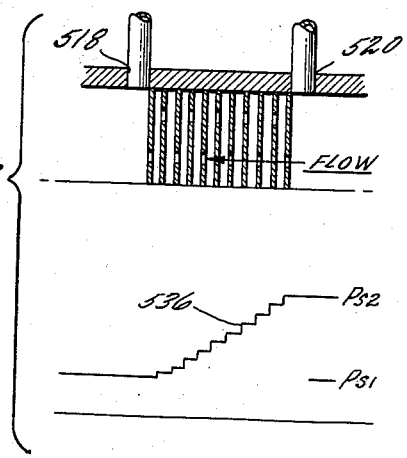
FIG. 7 is an exploded view showing details between two adjacent pressure taps of the valve shown in FIG. 6, together with a graphical illustration showing the pressure gradient therebetween.

A better understanding of the pressure probe may be had by referring to FIGS. 6 and 7. A duct for illustration purposes is schematically shown and generally indicated by numeral 500. As can be seen from this drawing, a series of pressure taps extend along the longitudinal axis of the duct. Obviously, the distance between taps and the number of taps will be dictated by the particular installation and accuracy required. While a single tap is shown at each station, it is contemplated by this invention that a rake of taps may be placed around the periphery of the duct at each station. These pressure taps are connected to a remotely mounted probe valve by lines 502, 504, 506, 508, 510, 512 and 514. Ports 518, 520, 522, 524, 526, 528 and 532, formed in housing 516 of the pressure probe valve, are spaced as a function of the spacings between the corresponding pressure taps. Hence, the ports 518 and 520 in the housing 516 are a function of the distance between taps 522 and 524 and the distance between ports 520 and 526 is a function of the distance between taps 524 and 528, etc. The housing 516 defines chamber 530, which chamber contains a plurality of plates 532 which extend transversely within the chamber 530 and are spaced apart to define smaller chambers between the edges of respective ports. The plates are formed with small sharp edged orifices 534, which are preselected to define the pressure profile between taps.

As noted in FIG. 7, the section between openings 518 and 520 has been exploded to illustrate graphically the typical details of the pressure profile. As can be seen from the graph in FIG. 7 which is a plot of pressure and distance, the profile 536 is substantially linear and increases by a plurality of graduated steps, which steps are defined by the sharp edge orifices 534 in the plates. Obviously, the shape of the graph or profile can be varied by displacing the distances between openings or varying the size of the orifices. The profile represents the pressure in chamber 530 measured across each plate as the flow passes between ports 520 and 518. It will be appreciated that the graph in FIG. 7 corresponds to the distance between ports 520 and 518.

Still referring to FIG. 6, a graphic illustration of the pressure profile taken along the longitudinal axis of the duct 500 is shown above the duct. This graph shows the static pressure plotted against the distance of the duct taken along its longitudinal axis and as noted, the pressure gradient shown as curve 540 rises gradually until it reaches the point where the shock occurs. At this point, a substantial rise in pressure is evidenced, as indicated by line 542. The static pressure in the diffuser section of the duct then continues to rise gradually, as illustrated by line 544. It will be noted in the graph drawn just below the pressure probe valve, which graph has the same abscissa while the ordinate is the distance extending between the ports in the casing 516. As noted, lines 541, 543 and 545 correspond to the lines 540, 542 and 544 in the graph above the duct. Hence, it is apparent from the foregoing that the chamber 530 serves to provide a replica of the pressure gradient or profile evidenced in duct 500. The pressure probe valve then serves to select two stations along the duct and transmits the pressure to a remotely mounted control. To this end, a sliding member 546 is mounted adjacent open end of housing 516. This member contains a flat surface 548 which underlies the opening of the chamber 530 and bears against the edges of the flat plates 534. The inner walls of the chamber, member 546 and the flat plates define a plurality of smaller chambers. Since the pressures in the most forward and most rearward station are different, the air in chamber 530 will flow from the high pressure point to the low pressure point and in this instance from port 532 to port 518. The air flows out into these smaller chambers by way of a series of orifices 535 formed in each of the plates. The size of these orifices is selected to provide a predetermined pressure drop thereacross to generally conform with the type of pressure gradient shown in FIG. 7. It is possible and contemplated by this invention to vary the spaces between the various taps or varying the size of the orifices to obtain any defined pressure profile which may be implemented for control convenience.

As illustrated in FIG. 6, member 546 contains a pair of spaced passages 554 and 552 which may be moved along the chamber to communicate with the pockets formed in chamber 530. The pressure is then transmitted to a suitable sensor for controlling the position of the shock.

Referring now to the FIGS. 8 to 10 which show the first stage valve 100 and second stage valve 248 of control 22 and the actuator 18, respectively. It will be appreciated that control 22 in this type of application is remotely mounted from the actuator 18. Actually the spike actuator 18, as well as the bypass actuator 20, may be located adjacent the spike and bypass respectively. It is also necessary to amplify the input signal so as to obtain sufficient force to move a relatively large actuator. The second stage valve is located at the actuator since it is impractical and inefficient to transmit large amounts of hydraulic flow over the distance involved. Because the second stage valve must respond accurately to the first stage valve, it is necessary to incorporate a suitable feedback, and since the valves are remotely mounted from each other, mechanical feedback systems are impractical. In accordance with this invention, the hydraulic feedback system is utilized to afford the proper feedback function, which system is characterized as being relatively simple. Feedback is effectuated by providing land 560 on spool 266 which cooperates with a slot 562 formed in the valve housing. As was mentioned earlier, valve 248 may be of the half-area type valve such that the area on the left-hand end of spool 266 equals twice the area on the right-hand end. For ease of manufacturing and assembly, the valve is constructed from two pieces, spool 266 and piston 566, but for functionality it can be assumed that the spool is one piece.

High pressure generated by pump 568 is supplied to chamber 564 through connecting lines 572 and 574. Servo pressure is introduced into chamber 562 through lines 254 and 250 and this pressure is controlled by metering high pressure fluid by virtue of land 576 formed on spool 102. High pressure fluid is conducted into annulus 578 through line 572 and drain pressure is conducted into annulus 580 through line 582 and line 584. So that it can be seen that upon movement of spool 102 the line 250 will either be communicating with high pressure or drain pressure, depending on the directional movement. Spring 586 is mounted on the underneath side of spool 102 for counteracting the forces generated by the input signal. This spring merely serves to keep backlash out of the mechanism. Hence, it can be seen from the foregoing that in order to keep the spool 266 on its line-on-line position with the various ports formed in the valve housing, pressure in chamber 562 must be half the pressure within chamber 564. This is apparent because the areas are in the ratio of 2:1. Additional branch lines 586 and 588 interconnect line 268 for conducting high pressure pump fluid into annulus 590 and 592, respectively. Hence it can be seen that upon shifting of the spool in response to a change in pressure the lands formed on spools 266 will uncover a series of ports. Two of these ports communicate with the chambers 592 and 594, formed on either end of the piston 596, which corresponds to the spike actuator piston in FIG. 3. Lines 598 and 600 interconnect ports 602 and 604 respectively for conducting the fluid into and out of chambers 592 and 594. Hence upon movement of the spool and assuming such movement to be to the right, ports 604 and 602 become uncovered, allowing high pressure in chamber annulus 590 to communicate with port 604 for conducting high pressure fluid through line 600 to chamber 594; and port 602 becomes uncovered for communicating the pressure in chamber 592 with drain by metering fluid through line 598 to annulus 604 through passage 278, through passage 280, and then eventually into drain line 606. Obviously a reversal in direction of movement of spool 266 will communicate chamber 592 with high pressure fluid and chamber 594 with low pressure fluid, hence causing the piston 596 to move in the opposite direction.

As noted in FIG. 8, when the spool 266 moved to the right, it simultaneously uncovered port 562 and opening servo line 250 to drain the annulus 609 and the interconnecting line 610. Obviously to shift the spool 266 to the right, the servo pressure must have increased by virtue of movement of the pilot valve 100. By opening port 562 to drain the valve tends to reduce the pressure in chamber 562 by the interconnection through annulus 608 and through lines 254, 250 and 614. The pressure will continue to reduce until the pressure in chamber 562 equals one-half the pressure in chamber 564. When this occurs, the valve spool assumes a position proportional to the position of valve 100. In the meantime, piston 596 translates at a velocity corresponding to the position of spool 266 until the control system has relayed a feedback signal back to valve 100 to its line-on-line position. In this way the servo system has returned to its steady state or equilibrium condition, and will continue to move as described until equilibrium is achieved. Obviously, when the servo pressure from valve 100 decreases, the valve spool 266 moves to the left, land 560 again uncovers port 562 but in the opposite direction for conducting high pressure fluid evidenced in annulus 590 into chamber 562 by way of lines 614, 250, and 254. This high pressure fluid serves to increase the pressure in chamber 562 and when this pressure is equal to one half the pressure in chamber 564, the valve spool position will be proportioned to the position of valve 100 and, as above, piston 596 will translate at a velocity until the control system feedback restores the valve to a null position. When it has reached this line-on-line position, it is apparent from the foregoing that the valve has returned to its steady state condition. Amplification is accomplished in the following manner. The first stage amplification valve 100 serves to sense a relatively low power input signal, transmits that signal to second stage valve 248, which amplifies the signal and generates sufficient force to actuate the piston 596. Amplification is provided by properly sizing slits 562 and 563, (see FIGS. 9 and 10). It will be noted that slit 562 is narrower than slit 563, for causing spool 266 to travel a greater distance to uncover the same opening area defined by land 576 cooperating with slit 563. This area matching is required to enable pressure in space 552 to be half of pressure in 564. Hence, from a given input signal the spool 102 will displace a given distance and spool 266 will displace a proportionally greater distance to uncover an opening area defined by land 560 and slit 562 to equal the opening area defined by and 576 and slit 562. Since the slit 562 is narrower than slit 563, spool 266 must travel a greater distance in order to uncover the same area. Hence, for a given signal the spool 266 having to travel a greater distance than spool 102 in response to the signal, will uncover a greater percentage of the port area leading into and out of chambers 592 and 594, respectively, providing a larger capacity of flow into and out of chambers 594 and 592. In this manner, amplification is provided.

*Operation*

Now that the control has been described in detail, reference is made to the operation thereof. The overall system is comprised of: (a) a spiked actuator with an altitude sensor, spike locks with the manual overrides, (b) a bypass position actuator with the manual override valves and (c) the main control consisting of the local Mach sensor and servo, the attitude sensor and servo, the shock expulsion sensor and servo, shock position sensor, shock position traversing probe servo and valve, and afterburner anticipator sensor. In addition, an attitude sensing probe serves to feed signals to the main control. The system also includes an emergency system to assure safe operating conditions in the event of a malfunction in the hydraulic power supply system.

In general then, the control 22 utilizes local Mach number Pitot pressure and local Mach number static pressure to compute the local Mach number by means of a force balance pressure ratio sensor, the local Mach sensor. The change in Mach number upsets the force balance in sensor 30 and causes the jet pipe valve to displace. The jet pipe valve then meters hydraulic fluid to the local Mach servo piston, causing it to translate. This motion is fed back to the sensor rollers to restore the force balance, null the jet pipe valve and stop the servo motion. The position of the local Mach number servo then is uniquely related to Mach number and is used to form an input to the spike scheduling system. This input displaces the first stage spike control valve which controls the pressure of one end of the second stage spike control valve. The second stage valve acts as a four-way pilot valve to position the spike actuator and is itself a hydraulically nulling half-area servo. That is, its displacement from its null position will be proportional to the displacement of the first stage spike control valve from its null position.

Displacing second stage spike control valve 248 from its null, ports fluid flow to the spike actuator piston causing it to move the spike. Spike motion is then fed back to reposition first stage spike control valve 100 by means of feedback cable 104 and the receiver mechanism, three dimensional cam-24, and the attendant connecting linkage. The longitudinal position of the three dimensional cam-24 is a direct function of actual spike position.

The spike is fully extended at speeds below say approximately 1.4 local Mach number and locked forward at altitudes below say approximately 10,000 feet. Above this altitude the spike is unlocked and at higher speeds the spike is moved toward the retracted position until at cruise Mach number the spike if fully retracted. As mentioned earlier, retracting the spike decreases the throat area, decreases drag, enables the bypass control and associated sensors to position the normal shock for optimum operation.

The attitude probe and servo act to provide a bias on spike position with aircraft attitude to improve inlet performance and to prevent an expelled shock during rapid maneuvers. The attitude probe mounts two Pitot tubes 72 and 74 at angle to the probe center line. The fin on the probe rotates it in the plane of maximum attitude angle. As the attitude angle changes the ratio of the pressures in the respective probes will change. The attitude sensor positions the attitude servo as a function of this pressure ratio in a manner similar to that of the Mach sensor servo. The attitude servo rotates the three dimensional cam-24 and is utilized to provide an input to the first stage spike control valve. The lower contour on this cam biases the position of the spike. The spike position is therefore a function of local Mach number and attitude angle. Spike locks are provided to insure that the spike remains fully extended at altitudes say below approximately 10,000 feet. The evacuated bellows 312 exposed to local Mach static pressure positions jet spike 304 which provides hydraulic pressure which added to the spring force generated by springs 300 and 302 keeps the locks engaged below this altitude. Above 10,000 feet the jet spike valve directs pressure to open the spike locks.

Bypass position is obtained as follows. Above the flight Mach number at which the normal shock wave is swallowed by the inlet it is desirable to control the position of the shock wave so that the operation of the inlet is near critical. Shock position control is accomplished by modulating a bypass in the inlet diffuser. If the bypass opening is increased, shock wave will move back toward the engine. If it is decreased the shock wave will move forward. The series of static pressure taps in the duct are connected to the traversing probe valve 152 which provides a pressure profile of the inlet around the periphery of the valve. The center rotor of the probe valve is positioned angularly by a contour on cam 24 through the traversing probe valve and servo. This rotor therefore has a unique position for any combination of spike position and attitude angle. The angular position of the probe represents the desired position of the shock wave for optimum operation.

As the air passes from supersonic to subsonic through the normal shock wave there is a rapid increase in pressure. This can be seen by referring to FIG. 6. The pressure ratio across the two taps on the probe valve rotor is an indication of actual shock position relative to the desired position represented by the rotor position. This pressure ratio is compared to the desired pressure ratio by the shock position sensor 31. If the actual pressure ratio differs from the desired ratio, the jet spike valve of the shock position sensor will be displaced from null, moving the bypass control integrating piston 360. Piston 360 will in turn displace the bypass control valve 366 from null causing the bypass actuator 368 to move opening or closing the bypass. The motion of the actuator is fed back to the bypass control valve through cam 402 and the attendant linkages, but motion will continue until the shock has been positioned in the throat, so that the pressure ratio sensed matches the desired pressure ratio and the sensor jet spike valve is nulled. If the shock wave is too far forward in the throat, the pressure ratio will be too high, the bypass will move toward a more open position, thus, causing the shock to move back to the correct position. The opposite will occur if the shock is too far aft.

Should a violent disturbance in the engine or in the air profile entering the inlet cause the shock wave to be expelled, the control initiates corrective action as follows. During normal started operation, the pressure acting on the outside of bellows 214 is higher than the pressure acting internally of that bellows and the shock expulsion sensor 25 will hold the shock expulsion servo in its inactive position. When the shock is expelled these two pressures more nearly equal each other and the shock expulsion sensor 25 moves jet spike valve 222 which changes the pressure from the end of the shock expulsion servo 228. The spring behind the servo moves it to the shock expelled position. This shuts off the signals from the first stage spike control valve 100 and from the shock position sensor 31 and provides signals to the second stage spike control valve 248 and the bypass integrating piston 360 to open the bypass and extend the spike. This causes the inlet throat area to increase. When the correct area for shock swallowing is reached, and with the bypass open, the shock wave re-enters the inlet. The shock expulsion system is then deactivated and normal control resumes, returning the shock wave to the desired position.

Operation of the shock expulsion sensor 30 is prevented below approximately 1.8 local Mach number by the shock expulsion arming valve which is positioned by the local Mach number servo.

As mentioned earlier, afterburner light-off causes airflow transient in the inlet, which would cause the shock wave to be expelled unless anticipatory action is taken. Turbine discharge pressure which is indicative of afterburner light-off is ported to the afterburner anticipator sensor 26. When the rate of change of this pressure is sufficiently high this derivative sensor switches a pneumatic valve which vents pressure in line 208 to the casing holding bellows 170 to subject it to its pressure. This false signal indicates that the shock wave is too far forward and the shock position sensor 30 starts to open the bypass to bring it to the rear. When the actual airflow transient occurs, there is margin for the shock wave to more upstream without being expelled. When the pressure transient dies out, the anticipator sensor 26 is deactivated and normal control resumes, returning the shock wave to the desired position.

A manual override solenoid valve 290 is provided on spike actuator 18 which allows the pilot to override the automatic system and position the spike full forward. When the spike reaches the full forward position, the spike actuates an indicator switch which is used to light a light in the cockpit confirming the override function. The spike lock indicator switch also actuates a switch to light a light to indicate its position thus giving warning to the pilot that the spike locks are energized to lock and the spike is in its forward position.

Bypass actuator 20 is provided with two manual overrides 386 and 382. When the pilot throws a switch the open bypass manual override solenoid is activated moving the actuator to open bypass position. A warning light is connected to a bypass open indicator switch and lights when the pilot's switch is closed and the bypass is not fully opened. This warning light goes out and a second light lights when the bypass reaches the fully opened position. Opening the bypass doors provides maximum airflow to the engine when landing or taking off.

The pilot may also override the automatic system to close the bypass by the close bypass manual override solenoid valve.

The emergency system is provided to enable the pilot to extend the spike and close the bypass should there be a loss of hydraulic pressure. In this case, the pilot will throw a switch actuating the emergency solenoid 332. This will remove the support from the frangible diaphragm 328 which seals the high pressure helium filled bottle. Diaphragm 328 will rupture introducing pressure behind the bypass control and spike control shuttle valves, respectively. These valves will move introducing pneumatic pressure of the helium bottle behind the actuators to close the bypass and extend the spike.

It is to be understood that the invention is not limited to the specific embodiment herein illustrated and described, but may be used in other ways without departing from its spirit.

It is claimed:

1. A control for a supersonic inlet having a bypass for bleeding the inlet air, said inlet during operation having a pressure gradient along the axis of flow, sensing means for sensing said pressure gradient, simulating means connected to said sensing means and located externally of the inlet for generating a plurality of simulated pressures corresponding to but on a reduced scale of said gradient, means connected to said simulating means for selecting a desired position of a particular pressure gradient condition, means operatively connected to said simulating means for sensing the selected pressures, means for comparing the desired position of the pressure gradient condition and the selected pressures to produce an error signal, and means receiving said error signal for varying the bypass.

2. Means for scheduling the position of a shock wave in a supersonic inlet comprising, means for sensing the position of the shock in the inlet, said means including a simulating device having a plurality of chambers, pressure drop producing means adjacent said chambers for producing a pressure gradient corresponding to the pressure gradient in the inlet and means for selecting points along said chambers to produce a signal commensurate with the position where the shock should occur in the inlet.

3. Apparatus for controlling shock wave in a supersonic inlet comprising, a bypass in the inlet, means for scheduling shock wave in the inlet, means for sensing the position of the shock wave in the inlet, said means including sensing means for sensing the pressure gradient along the axis of the inlet as a simulating device having a plurality of chambers connected to the sensing means so that each adjacent chamber communicates with adjacent stations being sensed, pressure drop producing means adjacent said chambers for producing a pressure gradient corresponding to but on a reduced scale of the pressure gradient in the inlet, means for selecting points along said chambers to produce a shock signal, and means responsive to said shock signal for controlling said bypass.

4. A pressure duplicating device having a plurality of inlets, a chamber receiving flow from said inlets at predetermined spaced intervals, means in said chamber for dividing said intervals into a plurality of subchambers, pressure drop producing means interconnecting adjacent subchambers, and a pair of pressure pick ups movable into communication with selected spaced subchambers.

5. In combination with a supersonic aircraft having a propulsive engine, a variable geometry inlet capable of having a shock formed therein and connected with the engine for supplying air thereto, means responsive to an inlet operating characteristic during supersonic operations and the geometry of the inlet for producing a scheduled signal, sensing means including a plurality of axially spaced pressure taps in the inlet for sensing the pressure gradient along the axis of flow therein, control means responsive to the actual shock position and said scheduled signal for controlling the position of said shock, said control means including a pressure simulating device remotely mounted from the inlet, said device having a plurality of chambers so that each adjacent chamber communicates with adjacent pressure taps, pressure drop producing means adjacent said chambers for producing a pressure gradient corresponding to but on a reduced scale of the pressure gradient in the inlet.

6. In a combination as claimed in claim 5 wherein said control means includes a bypass in the inlet.

7. In a combination as claimed in claim 5 wherein said characteristic of inlet condition is the angle of attack and yaw of the inlet with respect to the relative wind.

8. In a combination as claimed in claim 5 wherein said control means includes a cam movable in one direction in response to the geometry of the inlet and movable in another direction in response to said parameter.

9. In a combination as claimed in claim 7 wherein said control means includes a cam movable in an axial direction in response to the geometry of the inlet and in a rotatable direction in response to the angle of attack and yaw of the inlet with respect to the relative wind.

10. In an air inlet control system for a supersonic aircraft having an air-breathing power plant, a variable geometry inlet having a shock formed therein for leading air to said power plant, means responsive to the geometry of the inlet and the attitude of the inlet for producing a scheduled signal, control means responsive to the shock wave and the scheduled signal for controlling the position of the shock wave, and means responsive to the local Mach number and the scheduled signal for varying said geometry, said control means including a simulating device having a plurality of chambers, pressure drop producing means at predetermined pressure intervals adjacent said chambers, connection means interconnecting said pressure producing means and pressure taps formed along the longitudinal axis of the inlet for producing a pressure gradient corresponding to the pressure gradient in the inlet, and a pair of pick ups adjacent said chambers for selectively picking up points along said chambers for producing a pressure signal, and means responsive to said pressure signal for controlling the position of said shock wave.

11. An air inlet control for a supersonic inlet having a shock wave formed therein comprising, in combination, means for discharging air from the inlet for positioning said shock wave, means for sensing the position of said shock wave, means for selecting the desired position of said shock wave, means responsive to the sensing means and selecting means for controlling said discharging means, said sensing means including a pressure simulating device remotely mounted from the inlet and having fluid connections interconnecting stations taken along the longitudinal axis of the inlet and the pressure simulating device, means connecting said fluid connections for leading flow in the simulating device for producing a series of pressure drops for duplicating the pressure in the inlet, selector means adjacent said simulating device for selecting pressures corresponding to the pressures at predetermined intervals along the inlet.

12. A control for a supersonic inlet having a certain operating characteristic during supersonic operation, said inlet during said operation having a pressure gradient along the axis of flow, sensing means for sensing said pressure gradient, simulating means externally of the inlet and connected to said sensing means for producing a plurality of pressures similar to but on a reduced scale of said pressure gradient, scheduling means responsive to said characteristic for selecting pressures from said plurality of pressures to obtain the desired position of a particular pressure gradient condition in the inlet, means operatively connected to said simulating means for sensing said selected pressures of said plurality of pressures, means for comparing the selected pressures with a referenced pressure to produce an error signal, and means receiving said error signal for varying said characteristics of operation to eliminate said error signal.

References Cited by the Examiner
UNITED STATES PATENTS

| | | | |
|---|---|---|---|
| 2,638,738 | 5/53 | Salter | 60—35.6 |
| 2,920,446 | 1/60 | Ranard | 60—39.29 X |
| 2,934,893 | 5/60 | Streeter | 60—35.6 |
| 2,969,939 | 1/61 | Sulkin et al. | 244—53.8 |
| 2,971,328 | 2/61 | McLafferty | 60—35.6 |
| 2,997,843 | 8/61 | Arnett et al. | 60—39.29 X |
| 3,102,387 | 9/63 | Casper et al. | 60—39.28 X |

FERGUS S. MIDDLETON, *Primary Examiner.*

ANDREW H. FARRELL, MILTON BUCHLER,
*Examiners.*